US010477488B2

(12) United States Patent
Hong et al.

(10) Patent No.: US 10,477,488 B2
(45) Date of Patent: Nov. 12, 2019

(54) METHOD FOR TRANSMITTING SIGNALS BY CONSIDERING INTERFERENCES IN FED2D ENVIRONMENT AND APPARATUS THEREFOR

(71) Applicant: LG ELECTRONICS INC., Seoul (KR)

(72) Inventors: Jongwoo Hong, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/094,079

(22) PCT Filed: Apr. 14, 2017

(86) PCT No.: PCT/KR2017/004071
§ 371 (c)(1),
(2) Date: Oct. 16, 2018

(87) PCT Pub. No.: WO2017/183865
PCT Pub. Date: Oct. 26, 2017

(65) Prior Publication Data
US 2019/0132804 A1 May 2, 2019

Related U.S. Application Data

(60) Provisional application No. 62/323,782, filed on Apr. 17, 2016.

(51) Int. Cl.
*H04W 52/24* (2009.01)
*H04W 52/46* (2009.01)
*H04W 88/04* (2009.01)

(52) U.S. Cl.
CPC ......... *H04W 52/241* (2013.01); *H04W 52/24* (2013.01); *H04W 52/243* (2013.01); *H04W 52/46* (2013.01); *H04W 88/04* (2013.01)

(58) Field of Classification Search
CPC . H04W 52/241; H04W 52/24; H04W 52/243; H04W 52/46; H04W 88/04
(Continued)

(56) References Cited

U.S. PATENT DOCUMENTS 7,046,726 B2 * 5/2006 Jayaraman ........ H04L 25/03057
375/222
7,313,126 B2 * 12/2007 Yun ...................... H04W 76/10
370/344
(Continued)

FOREIGN PATENT DOCUMENTS

KR 10-2009-0089985 A 8/2009
KR 10-2010-0074802 A 7/2010
WO 2015/170934 A1 11/2015

OTHER PUBLICATIONS (3) Yang, et al., "Shared Relay-Based Interference Management Schemes for Device-to-Device Radio Underlaying Cellular Networks", The Journal of Korean Institute of Communications and Information Sciences (J-KICS), (Apr. 2013)—Fusion Technology, vol. 38A, No. 4, Apr. 2013, pp. 371-380.

*Primary Examiner* — Hai V Nguyen
(74) *Attorney, Agent, or Firm* — Dentons US LLP

(57) ABSTRACT

A method for transmitting, by a first relay user equipment (UE), signals by considering interferences in a further enhancement D2D (FeD2D) environment comprises the steps of: calculating, by the first relay UE, a distance to a virtual remote user equipment (UE) located on a straight line between the first relay UE and a second relay UE; determining an allowable interference intensity for the virtual remote UE, on the basis of a predetermined target signal to interference and noise ratio (SINR) value for the virtual remote UE and an intensity of a received signal from the second relay UE of the virtual remote UE; determining a transmission power on the basis of the allowable interfer-
(Continued)

ence intensity and the calculated distance; and comparing the determined transmission power with a minimum transmission power that satisfies the target SINR, wherein the virtual remote UE may be located at a threshold of a target range of the second relay UE.

14 Claims, 4 Drawing Sheets

(58) Field of Classification Search
USPC .......................................................... 455/522
See application file for complete search history.

(56) References Cited

U.S. PATENT DOCUMENTS

| | | | | |
|---|---|---|---|---|
| 7,532,599 B2* | 5/2009 | Kim | ..................... | H04L 1/0003 370/203 |
| 7,545,765 B2* | 6/2009 | Larsson | ................. | H04B 7/155 370/328 |
| 7,944,879 B2* | 5/2011 | Choi | ..................... | H04B 7/155 370/329 |
| 8,160,048 B2* | 4/2012 | Du | ........................ | H04W 48/14 370/346 |
| 8,311,022 B2* | 11/2012 | Du | ........................ | H04W 48/14 370/338 |
| 8,488,562 B2* | 7/2013 | Nagaraja | ............... | H04W 52/12 370/252 |
| 8,553,665 B2* | 10/2013 | Du | ........................ | H04W 48/14 370/338 |
| 8,571,557 B2* | 10/2013 | Furukawa | .......... | H04B 7/15535 455/436 |
| 9,001,783 B2* | 4/2015 | Kim | ..................... | H04W 48/20 370/331 |
| 9,204,309 B2* | 12/2015 | Sachs | ................... | H04W 16/14 |
| 9,432,203 B2* | 8/2016 | Park | .................... | H04W 72/005 |
| 9,521,675 B2* | 12/2016 | Ge | ......................... | H04W 4/70 |
| 9,775,118 B2* | 9/2017 | Vargantwar | ........... | H04W 52/60 |
| 9,917,628 B2* | 3/2018 | Liang | .................. | H04B 7/0695 |
| 2004/0013190 A1* | 1/2004 | Jayaraman | ........ | H04L 25/03057 375/233 |
| 2004/0233918 A1* | 11/2004 | Larsson | ................. | H04B 7/155 370/400 |
| 2005/0025093 A1* | 2/2005 | Yun | ....................... | H04W 76/10 370/328 |
| 2006/0203777 A1* | 9/2006 | Kim | ..................... | H04L 1/0003 370/334 |
| 2007/0098009 A1* | 5/2007 | Du | ........................ | H04W 48/14 370/445 |
| 2008/0069034 A1* | 3/2008 | Buddhikot | ............ | H04W 40/14 370/328 |
| 2008/0081626 A1* | 4/2008 | Choi | ...................... | H04B 7/155 455/442 |
| 2010/0074117 A1* | 3/2010 | Du | ........................ | H04W 48/14 370/241 |
| 2010/0172291 A1* | 7/2010 | Kim | ....................... | H04W 48/20 370/328 |
| 2011/0034204 A1 | 2/2011 | Sawai et al. | | |
| 2011/0086641 A1* | 4/2011 | Guvenc | ................. | H04W 36/04 455/437 |
| 2011/0149769 A1* | 6/2011 | Nagaraja | ............... | H04W 52/12 370/252 |
| 2011/0237255 A1* | 9/2011 | Furukawa | .......... | H04B 7/15535 455/436 |
| 2012/0207049 A1* | 8/2012 | Du | ........................ | H04W 48/14 370/252 |
| 2012/0327794 A1* | 12/2012 | Han | .................... | H04W 52/143 370/252 |
| 2013/0029706 A1* | 1/2013 | Sachs | .................... | H04W 16/14 455/501 |
| 2015/0173060 A1* | 6/2015 | Ge | .......................... | H04W 4/70 370/252 |
| 2015/0195801 A1* | 7/2015 | Kim | ..................... | H04W 48/20 370/329 |
| 2017/0257155 A1* | 9/2017 | Liang | ................... | H04B 7/0695 |
| 2018/0115438 A1* | 4/2018 | Park | ..................... | H04W 76/16 |
| 2019/0037453 A1* | 1/2019 | Wang | ................ | H04W 36/0033 |
| 2019/0079540 A1* | 3/2019 | Yoon | .................... | G05D 1/0295 |
| 2019/0141566 A1* | 5/2019 | Hong | .................. | H04W 28/04 |
| 2019/0182140 A1* | 6/2019 | Tenny | .................... | H04L 43/16 |

\* cited by examiner

METHOD FOR TRANSMITTING SIGNALS BY CONSIDERING INTERFERENCES IN FED2D ENVIRONMENT AND APPARATUS THEREFOR

This application is a 35 use § 371 national stage entry of international application no. PCT/KR2017/004071 filed on Apr. 14, 2017, and claims priority to U.S. provisional application No. 62/323,782 filed on Apr. 17, 2016, all of which are hereby incorporated by reference in their entireties as if fully set forth herein.

TECHNICAL FIELD

The present invention relates to wireless communication, and more particularly, to a method of transmitting a signal in consideration of interference in an FeD2D environment and apparatus therefor.

BACKGROUND ART

D2D communication means that a UE communicates with another UE using a direct radio channel Although a UE means a user's equipment, it may be regarded as a sort of a UE to which the present invention is applicable when a network equipment such as an eNB transmits/receives a signal according to a communication system with a UE. Moreover, WAN DL communications may mean various existing communications for an eNB to transmit (E)PDCCH, PDSCH, CRS, CSI-RS and the like to a UE. Or, WAN communications may mean various existing communications for a UE to transmit PRACH, PUSCH, PUCCH and the like to an eNB.

DISCLOSURE OF THE INVENTION

Technical Tasks

One technical task achieved by the present invention is to provide a method for a first relay User Equipment (relay UE) to transmit a signal by considering interference in an FeD2D environment.

Another technical task achieved by the present invention is to provide a first relay User Equipment (relay UE) to transmit a signal by considering interference in an FeD2D environment.

It will be appreciated by persons skilled in the art that the technical tasks that could be achieved with the present invention are not limited to what has been particularly described hereinabove and other technical tasks that the present invention could achieve will be more clearly understood from the following detailed description.

Technical Solutions

In one technical aspect of the present invention, provided herein is a method of transmitting a signal by a first relay User Equipment (UE) in consideration of interference in a Further Enhancement D2D (FeD2D) environment, the method including calculating, by the first relay UE, a distance from a virtual remote UE located on a straight line between the first relay UE and a second relay UE, determining an allowable interference intensity for the virtual remote UE based on a prescribed target Signal to Interference and Noise Ratio (SINR) value for the virtual remote UE and a strength of a signal received from the second relay UE of the virtual remote UE, determining a transmission power based on the allowable interference intensity and the calculated distance, and comparing a size of the determined transmission power with a size of a minimum transmission power satisfying the target SINR, wherein the virtual remote UE is located in a target range of the second relay UE.

The method may further include if the determined transmission power is equal to or smaller than the minimum transmission power satisfying the target SINR, transmitting the signal to at least one remote UE using the same physical resource.

The same physical resource may include a resource configured by a network so as to be used by the first relay UE and the second relay UE together.

The calculating the distance may include calculating a distance from the second relay UE, obtaining information on the target range of the second relay UE, and calculating the distance from the virtual remote UE by subtracting the target range of the second relay UE from the calculated distance from the second relay UE.

The method may further include if the determined transmission power is greater than the minimum transmission power satisfying the target SINR, transmitting the signal to at least one remote UE using a resource different from a physical resource configured for the second relay UE.

Information on the target range of the second relay UE may be obtained from a Sidelink Control (SC) signal transmitted by the second relay UE. The remote UE may include a wearable UE or a Machine Type Communication (MTC) UE.

In another technical aspect of the present invention, provided herein is a first relay User Equipment (UE) transmitting a signal in consideration of interference in a Further Enhancement D2D (FeD2D) environment, the first relay UE including a processor configured to calculate a distance between the first relay UE and a virtual remote UE located on a straight line between the first relay UE and a second relay UE, determine an allowable interference intensity for the virtual remote UE based on a prescribed target Signal to Interference and Noise Ratio (SINR) value for the virtual remote UE and a strength of a signal received from the second relay UE of the virtual remote UE, determine a transmission power based on the allowable interference intensity and the calculated distance, and compare a size of the determined transmission power with a size of a minimum transmission power satisfying the target SINR, wherein the virtual remote UE is located in a target range of the second relay UE.

The first relay UE may further include a transmitter configured to, if the determined transmission power is equal to or smaller than the minimum transmission power satisfying the target SINR, transmit the signal to at least one remote UE using the same physical resource.

The same physical resource may be configured by a network so as to be used by the first relay UE and the second relay UE together.

The processor may be configured to calculate a distance from the second relay UE, obtain information on the target range of the second relay UE, and calculate the distance from the virtual remote UE by subtracting the target range of the second relay UE from the calculated distance from the second relay UE.

The first relay UE may further include a transmitter configured to if the determined transmission power is greater than the minimum transmission power satisfying the target SINR, transmit the signal to at least one remote UE using a resource different from a physical resource configured for the second relay UE.

The processor may be configured to obtain information on the target range of the second relay UE from a Sidelink Control (SC) signal transmitted by the second relay UE. The remote UE may include a wearable UE or a Machine Type Communication (MTC) UE.

Advantageous Effects

According to one embodiment of the present invention, relay UEs can considerably reduce signaling necessary to use the same physical resource distributively.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
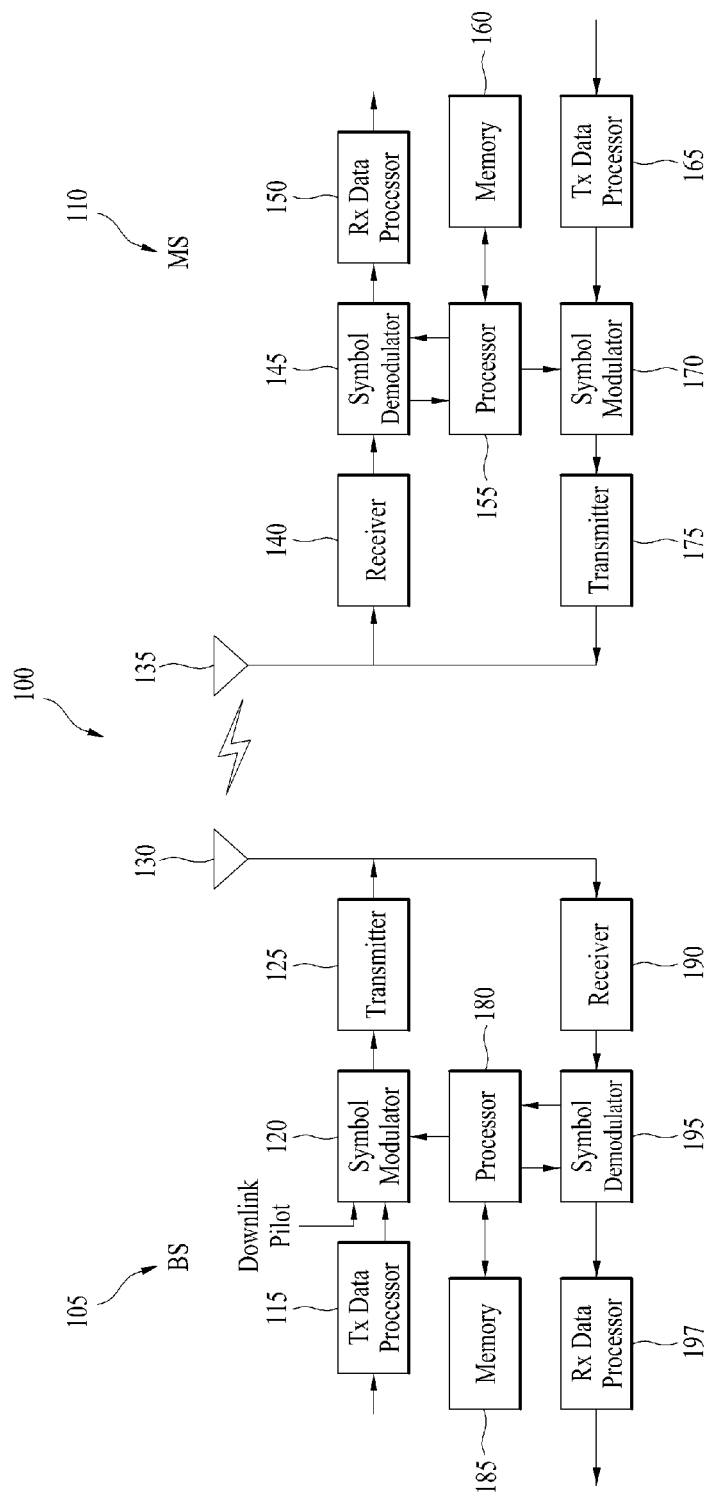
FIG. 1 is a block diagram showing configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Classification can be performed according to a content of a D2D signal transmitted on a resource pool in D2D communication. For example, a content of a D2D signal can be classified as follows. And, a separate pool may be configured for each content.

Scheduling Assignment (SA) (or, Sidelink Control (SC)): This means a signal including a location of a resource used by each D2D TX UE for transmission of a following D2D data channel and information such as MCS (modulation and coding scheme) required for demodulation of data channel, MIMO transmission scheme and the like. Such a signal can be transmitted on the same resource unit by being multiple with D2D data. In this case, an SC resource pool may mean a pool of resources on which SC is transmitted by being multiplexed with D2D data.

D2D data channel: This means a pool of resources used by a D2D TX UE to transmit user data using a resource designated through SC. If it is possible to transmit user data on the same resource unit by being multiplexed with SC information, a D2D data channel in a form except SC information may be transmitted on a resource pool for the D2D data channel So to speak, Resource Element (RE) used in transmitting SC information on an individual resource unit in an SC resource pool is still used to transmit D2D data in a resource pool of a D2D data channel.

Discovery message: This means a resource pool for a message that enables an adjacent UE to discover a D2D TX UE having transmitted information such as an ID of its own and the like.

The standard RAN work for activating proximity services has started by focusing on public safety applications in LTE Rel. 12. Major functions standardized in LTE Rel. 12 are described as follows.

Device-to-Device discovery in network coverage (all cases of commercial and public safety uses).

In Device-to-Device broadcast communication, higher layers support groupcast and unicast communications for in-coverage/part of a network, which mainly targets public safety use cases, and out-of-coverage of the network.

There is a lot of interest in connecting and managing low-cost MTC devices using LTE technology. One of major examples of the low-cost devices is a wearable device, which is advantageous in approaching a smartphone capable of playing a role as a relay all the time.

A UE-to-network relay structure in ProSe does not discriminate traffic of a relay UE and traffic of a remote UE from each other in an access layer. This model restricts the ability that a network and operator handles a remote UE as a separate device for an individual service for billing or security. Particularly, 3GPP security association does not reach end-to-end between a network and a remote UE, which means that a relay UE has a clear text access to remote UE's communication. In order to support a relay link, service continuity, E2E QoS for possible case, efficient operation with multiple remote UEs, and end-to-end security through efficient route switching between Uu and D2D radio interfaces, UE-to-Network relaying should be enhanced.

A relaying that uses D2D may be based on a non-3GPP technology such as Bluetooth, Wi-Fi, or the like. Some enhanced functions such as service continuity may make the relaying for such technologies more attractive in commercial use cases. This can be particularly useful for the wearables due to usage patterns that are close to a user's smartphone and form-factor limitations that make direct Uu connections impractical (e.g., battery size limitations). Relaying can enable significant power savings for a remote UE (acquiring relayed traffic). This is particularly true in the deep coverage scenario. One of the cost-effective ways to introduce a relay is to use uni-directional D2D links between remote and relay devices. In this case, a relay UE can be used to relay uplink data only from a remote UE. An advantage of this approach is that there is no additional RF function to add D2D reception to the remote UE.

Figure 2:
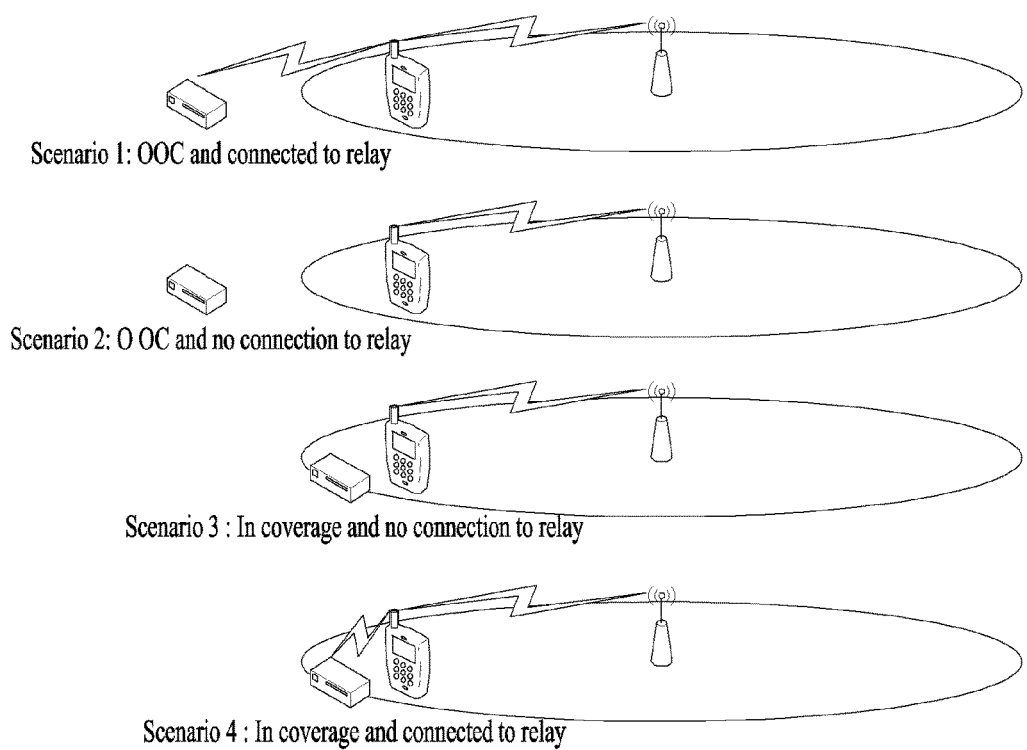
FIG. 2 is a diagram showing relay scenarios.

FIG. 2 is a diagram showing relay scenarios.

A relay scenario considers the following.

A remote UE and a relay UE are EUTRAN within the coverage.

A relay UE may be in EUTRAN coverage and a remote UE may be in enhanced coverage (the enhanced coverage means that a UE in CE mode is connected to a network through Rel-13 MTC).

A relay UE is in the EUTRAN coverage and a remote UE is out of the EUTRAN coverage.

Referring to FIG. 2, according to Scenario 1, a remote UE is located out of the EUTRAN coverage and connected to a relay UE. According to Scenario 2, a remote UE is located out of the EUTRAN coverage and not connected to a relay UE. According to scenario 3, a remote UE is located within the EUTRAN coverage and not connected to a relay UE. According to Scenario 4, a remote UE is located in the EUTRAN coverage and connected to a relay UE. As shown in FIG. 2, various relay scenarios can exist.

In Further Enhancement D2D (FeD2D) environment, a lot of transmitting D2D UEs (hereinafter 'tx D-UEs') and receiving D2D UEs (hereinafter 'rx D-UEs') coexist. The present invention proposes a method of reusing or simultaneously using a resource distributively and efficiently in an FeD2D environment of broadcast transmission. Namely, a method for several UEs to use the same time-frequency resource simultaneously is proposed. And, the present invention defines various configurations by satisfying Signal to Interference and Noise Ratio (SINR) of many neighboring receiving side devices and also considering a target application/service.

In an FeD2D environment (e.g., IoT, wearable), since available resources are insufficient due to many devices, it is necessary to consider the same time-frequency use (spatial reuse). Yet, using the same time-frequency use causes interference to the receiving side devices that use the existing resource for reception. The existing spatial reuse scheme considers an SINR of a single receiving side device based on unicast. Yet, since FeD2D considers not a unicast environment but a broadcast environment, SINRs of many neighboring receiving side devices should be satisfied simultaneously. In FeD2D, unlike the existing D2D of public safety, transmission can be performed in consideration of a target range for wearable devices in proximity Here, the target range may mean a maximum relaying distance of a relay UE of a corresponding class.

Since devices have no mobility or very small mobility, FeD2D environment is an environment advantageous for the same time-frequency in comparison with the existing D2D or V2X network. If a device performing a broadcast transmission with small power is far away, it is able to raise time-frequency use efficiency in a manner that other devices use a resource of the corresponding device.

All tx D-UEs transmit Sidelink Control (SC) signals for D2D transmission. If a tx D-UE measures a received power of such an SC signal, it is able to estimate or calculate a distance between the tx D-UEs. Moreover, if receiving an SC signal, a tx D-UE can be aware that each tx D-UE uses a prescribed resource through scheduling information of a resource to be used. Hence, the tx D-UE can be aware what kind of resource should be used for the same time-frequency use. When target range and power information is included in an SC signal, if all tx D-UEs receive all SC signals, it is able to measure a distance between the tx D-UEs that currently transmit the signals, respectively. Such target range and power information is simply configured as Table 1, defined in various class types in consideration of context/scenario of application/service, and transmitted by a base station.

TABLE 1

| Configuration | Target range | Target Transmission power | Target application |
|---|---|---|---|
| Class #1 | Short (e.g., 50 m) | Low (e.g., 10 dBm) | Wearable |
| Class #2 | Middle (e.g., 500 m) | Medium (e.g., 20 dBm) | MTC applications |
| Class #3 | Long (e.g., 1 km) | High (e.g., 23 dBm) | Commercial, SNS |

Referring to Table 1, a target range, a target transmission power and a target application can be configured per class. In Table 1, 3 kinds of classes are shown for example. And, the 3 kinds of the classes can be represented as 2 bits. A base station can transmit an SC signal in a manner that 2 bits indicating a class is included in the SC signal. By such class information, a distance between tx D-UEs can be simply estimated. Such classes can be extended to n classes and defined in consideration of n bits. Although data transmission is performed in consideration of a target transmission power, SC signal transmission may consider a case that transmission is performed with a maximum power by relay selection or periodic configuration. Based on information included in such an SC signal, it is able to determine a presence or non-presence of the same time-frequency use.

Same Resource Use Operation (or, Spatial Reuse Operation)

In case that a tx D-UE transmits a signal using a same resource (e.g., same time-frequency resource), interference is caused to rx D-UEs receiving the signal through previously allocated resources. In this case, a transmittable power can be adjusted in consideration of a specific SINR determined for the rx D-UE. A power transmittable for a use of the same resource is defined as an available transmission power or an allowable transmission power.

Figure 3:
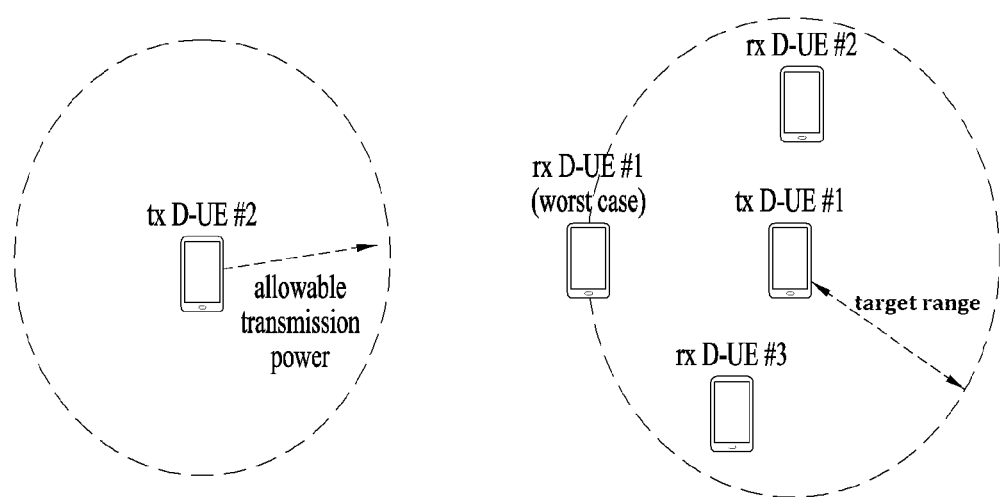
FIG. 3 is a diagram showing an example of multicast transmission of feedback information by a remote UE.

FIG. 3 is an exemplary diagram to describe a same resource use in an FeD2D environment.

In case of considering such a specific SINR, an adjustment is made by considering a virtual rx D-UE (e.g., rx D-UE #1) intending to use a same resource by being farthest away from a tx D-UE (e.g., tx D-UE #1). If an SINR of such a worst case (i.e., a minimum SINR) is satisfied, the rest of rx D-UEs are satisfied with SINR.

As shown in FIG. 3, if a tx D-UE #2 uses the same physical resource of a tx D-UE #1 (e.g., the same time-frequency resource), an rx D-UE #1 located at a threshold in a target range becomes a reference of a worst case to use the same time frequency. If an SINR of the rx D-UE #1 is calculated, SINR values of remaining rx D-UEs #2 and #3 are high due to an interference signal smaller than that of the worst case.

A detailed procedure proposed by the present invention is described with reference to FIG. 3 and FIG. 4.

Figure 4:
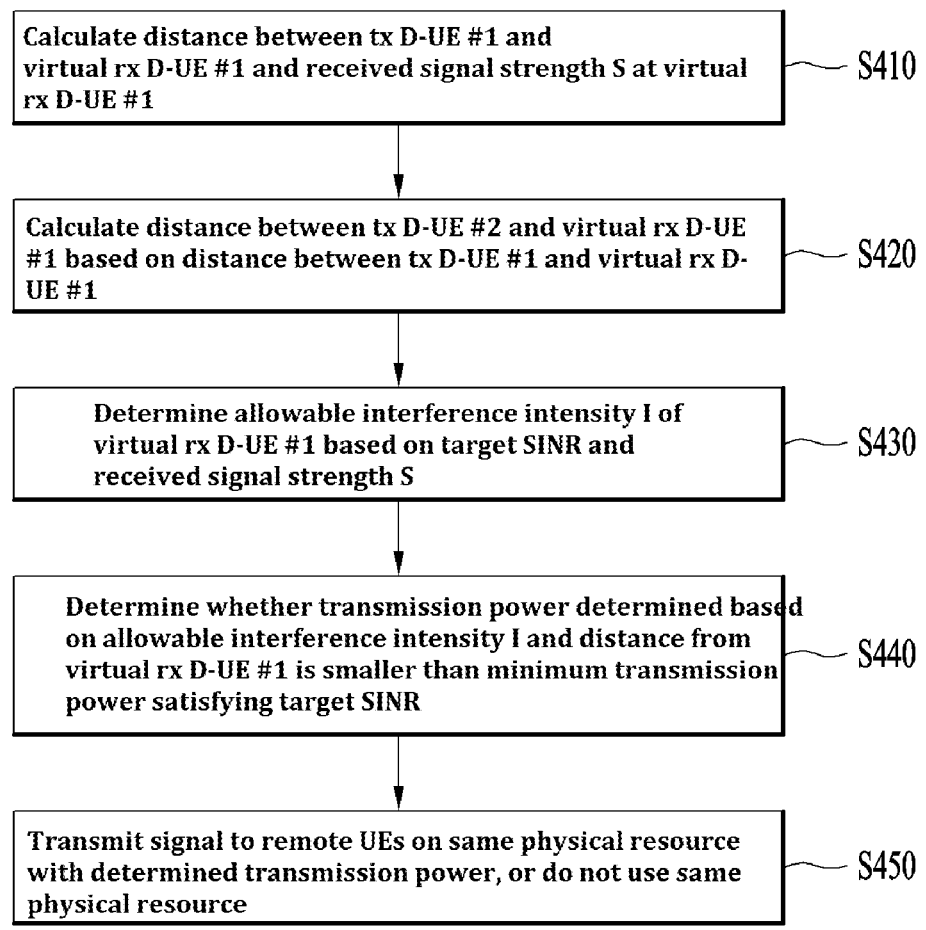
FIG. 4 is a diagram showing an example of multicast transmission of feedback information by a relay UE.

FIG. 4 is a diagram showing one example of a procedure for a relay UE (tx D-UE #2) to determine whether to use the same physical resource with a relay UE (tx D-UE #1) simultaneously.

A relay User Equipment (hereinafter, a relay UE) and a remote User Equipment (hereinafter, a remote UE) are connected to each other thorough a PC-5 connection or a PC-5 interface by a discovery procedure. System information on a remote UE may be broadcasted by an infra (e.g., a network, a base station, etc.) or transmitted by a relay UE. In this case, SINR information of a targeted application/service and information on a transmission power and range may be included in broadcast information.

In FIG. 3, the tx D-UE #1 and the tx D-UE 12 may correspond to relay UEs, and the ex D-UEs #1 to #3 may correspond to remote UEs. A relay UE (e.g., tx D-UE #1) can transmit a Sidelink Control (SC) signal and data to the remote UEs with a target transmission power using a transmission resource. The remote UEs (e.g., rx D-UEs #1 to #3) can receive the SC signal and data from the relay UE.

Another relay UE (e.g., tx D-UE #2) can receive an SC signal and data. The relay UE (e.g., tx D-UE #3) can configure a virtual rx D-UE (e.g., rx D-UE #1) on a straight line with another relay UE (e.g., tx D-UE #1).

The tx D-UE #2 can calculate a distance between the tx D-UE #1 and the virtual rx D-UE #1 [S410]. The distance between the tx D-UE #1 and the virtual rx D-UE #1 can be obtained from a target range in Table 1. For example, if a prescribed class in Table 1 is designated to an SC signal or the like transmitted by the tx D-UE #1, the tx D-UE #2 can determine a target range corresponding to the designated class as the distance between the tx D-UE #1 and the virtual rx D-UE #1. And, the tx D-UE #2 can calculate a received signal strength S of the virtual rx D-UE with reference to the transmission power of the tx D-UE #1.

The tx D-UE #2 can calculate a distance from the virtual rx D-UE #1 on the straight line with the tx D-UE #1 [S420]. Namely, the tx D-UE #2 can calculate a distance between itself and the virtual rx D-UE #1. A distance between relay UEs (e.g., tx D-UE #a and tx D-UE #2) can be known to each other through a strength of received SC signals mutually broadcasted. If a target range (i.e., distance between the relay UE (e.g., tx D-UE #1) and the virtual rx D-UE #1) is subtracted from the distance between the relay UEs (e.g., tx D-UE #1 and tx D-UE #2), it is able to calculate a distance between the tx D-UE #2 and the virtual rx D-UE #1.

In case that the tx D-UE #2 transmits a signal to the virtual rx D-UE #1 using a physical resource, interference is caused. Hence, the tx D-UE #2 determines a transmission power in a range smaller than an allowable interference intensity I [S430]. Namely, within a range satisfying a prescribed target SINR, the tx D-UE #2 can determine a transmittable transmission power to enable a level of causing an allowable interference to the virtual ex D-UE #1. In particular, the tx D-UE #2 can calculate an allowable interference intensity I at the virtual rx D-UE #1 based on a prescribed target SINR and a received signal strength S from the tx D-UE #1 at the virtual rx D-UE #1. The tx D-UE #2 may determine an allowable transmission power based on a distance from the virtual rx D-UE #1 to satisfy a prescribed target SINR at the virtual rx D-UE #1 based on the calculated allowable interference intensity I at the virtual rx D-UE #1 and the received signal strength S from the tx D-UE #1 at the virtual rx D-UE #1.

For example, when the target SINR is 3 dB, if the received signal strength S from the tx D-UE #1 at the virtual rx D-UE #1 is determined as 30 dBm, the tx D-UE #2 may determine the allowable interference intensity I as 15 dBm based on the target SINR and the received signal strength from the tx D-UE #1 at the virtual rx D-UE #1. Thereafter, the tx D-UE #2 can determine an allowable transmission power based on the allowable interference intensity (15 dBm), the received signal strength (30 dBm) from the tx D-UE #1 at the virtual rx D-UE #1, the target SINR (3 dB), and the distance from the virtual rx D-UE #1.

The tx D-UE #2 can determine whether the derived allowable transmission power of the tx D-UE #2 is smaller than a minimum transmission power satisfying the target SINR (or a target scenario) [S440]. As the virtual rx D-UE #1 has a minimum SINR, if this is satisfied, SINRs of all the rest of the remote UEs are satisfied. If the determined transmission power is smaller than the minimum transmission power satisfying the target SINR, the tx D-UE #2 can transmit a signal to at least one remote UE(s) belonging to the coverage of the tx D-UE #1 on the same physical resource as the relay UE (e.g., tx D-UE #2) with the determined transmission power. On the contrary, if the determined transmission power is smaller than the minimum transmission power satisfying the target SINR, since an SINR of at least one UE transmitting a signal using an existing resource can be affected in case of using the same physical resource, the same physical resource is not used. For example, the tx D-UE #2 can transmit a signal to at least one or more remote UEs belonging to the coverage of the tx D-UE #1 using a resource different from a resource configured for the tx D-UE #1 by a network.

In order to use the same physical resource on an existing D2D network, an available resource is allocated through a centralized coordinator. Or, among distributively many D-UEs, mutual distances are measured through complicated signaling and physical resource (time-frequency resource) information is exchanged. Yet, the existing method is not preferable if considering signaling overhead for the same physical resource use. According to the above-proposed method, tx D-UEs mutually measure in-between distances through SC signals and share information on used resources with each other, whereby the same physical resource use is enabled using a simple protocol and signal of the existing standard.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting a signal in consideration of interference in an FeD2D environment is industrially applicable to various kinds of wireless communication systems such as 3GPP LTE-A system, 5G system, IoT technology, etc.

What is claimed is:

1. A method of transmitting a signal by a first relay User Equipment (UE) in consideration of interference in a Further Enhancement D2D (FeD2D) environment, the method comprising:
calculating, by the first relay UE, a distance from a virtual remote UE located on a straight line between the first relay UE and a second relay UE;
determining an allowable interference intensity for the virtual remote UE based on a prescribed target Signal to Interference and Noise Ratio (SINR) value for the virtual remote UE and a strength of a signal received from the second relay UE of the virtual remote UE;
determining a transmission power based on the allowable interference intensity and the calculated distance; and
comparing the determined transmission power with a minimum transmission power satisfying the target SINR,
wherein the virtual remote UE is located in a target range of the second relay UE.

2. The method of claim 1, further comprising:
when the determined transmission power is equal to or smaller than the minimum transmission power satisfying the target SINR, transmitting the signal to at least one remote UE using a same physical resource.

3. The method of claim 1, wherein a same physical resource is configured by a network so as to be used by the first relay UE and the second relay UE together.

4. The method of claim 1, wherein calculating the distance comprises:
calculating a distance from the second relay UE;
obtaining information on the target range of the second relay UE; and
calculating the distance from the virtual remote UE by subtracting the target range of the second relay UE from the calculated distance from the second relay UE.

5. The method of claim 1, further comprising:
when the determined transmission power is greater than the minimum transmission power satisfying the target SINR, transmitting the signal to at least one remote UE using a resource different from a physical resource configured for the second relay UE.

6. The method of claim 4, wherein information on the target range of the second relay UE is obtained from a Sidelink Control (SC) signal transmitted by the second relay UE.

7. The method of one of claim 2, wherein the remote UE comprises either a wearable UE or a Machine Type Communication (MTC) UE.

8. A first relay User Equipment (UE) transmitting a signal in consideration of interference in a Further Enhancement D2D (FeD2D) environment, the first relay UE comprising:
a processor configured to:
calculate a distance between the first relay UE and a virtual remote UE located on a straight line between the first relay UE and a second relay UE;
determine an allowable interference intensity for the virtual remote UE based on a prescribed target Signal to Interference and Noise Ratio (SINR) value for the virtual remote UE and a strength of a signal received from the second relay UE of the virtual remote UE;
determine a transmission power based on the allowable interference intensity and the calculated distance; and
compare the determined transmission power with a minimum transmission power satisfying the target SINR,
wherein the virtual remote UE is located in a target range of the second relay UE.

9. The first relay UE of claim 8, further comprising:
a transmitter configured to transmit the signal to at least one remote UE using a same physical resource, when the determined transmission power is equal to or smaller than the minimum transmission power satisfying the target SINR.

10. The first relay UE of claim 8, wherein a same physical resource is configured by a network so as to be used by the first relay UE and the second relay UE together.

11. The first relay UE of claim 8, wherein the processor is further configured to:
calculate a distance from the second relay UE;
obtain information on the target range of the second relay UE; and
calculate the distance from the virtual remote UE by subtracting the target range of the second relay UE from the calculated distance from the second relay UE.

12. The first relay UE of claim 8, further comprising:
a transmitter configured to transmit the signal to at least one remote UE using a resource different from a physical resource configured for the second relay UE when the determined transmission power is greater than the minimum transmission power satisfying the target SINR.

13. The first relay UE of claim 11, wherein the processor obtains information on the target range of the second relay UE from a Sidelink Control (SC) signal transmitted by the second relay UE.

14. The first relay UE of one of claim 9, wherein the remote UE comprises either a wearable UE or a Machine Type Communication (MTC) UE.

* * * * *